United States Patent Office 2,983,338
Patented May 9, 1961

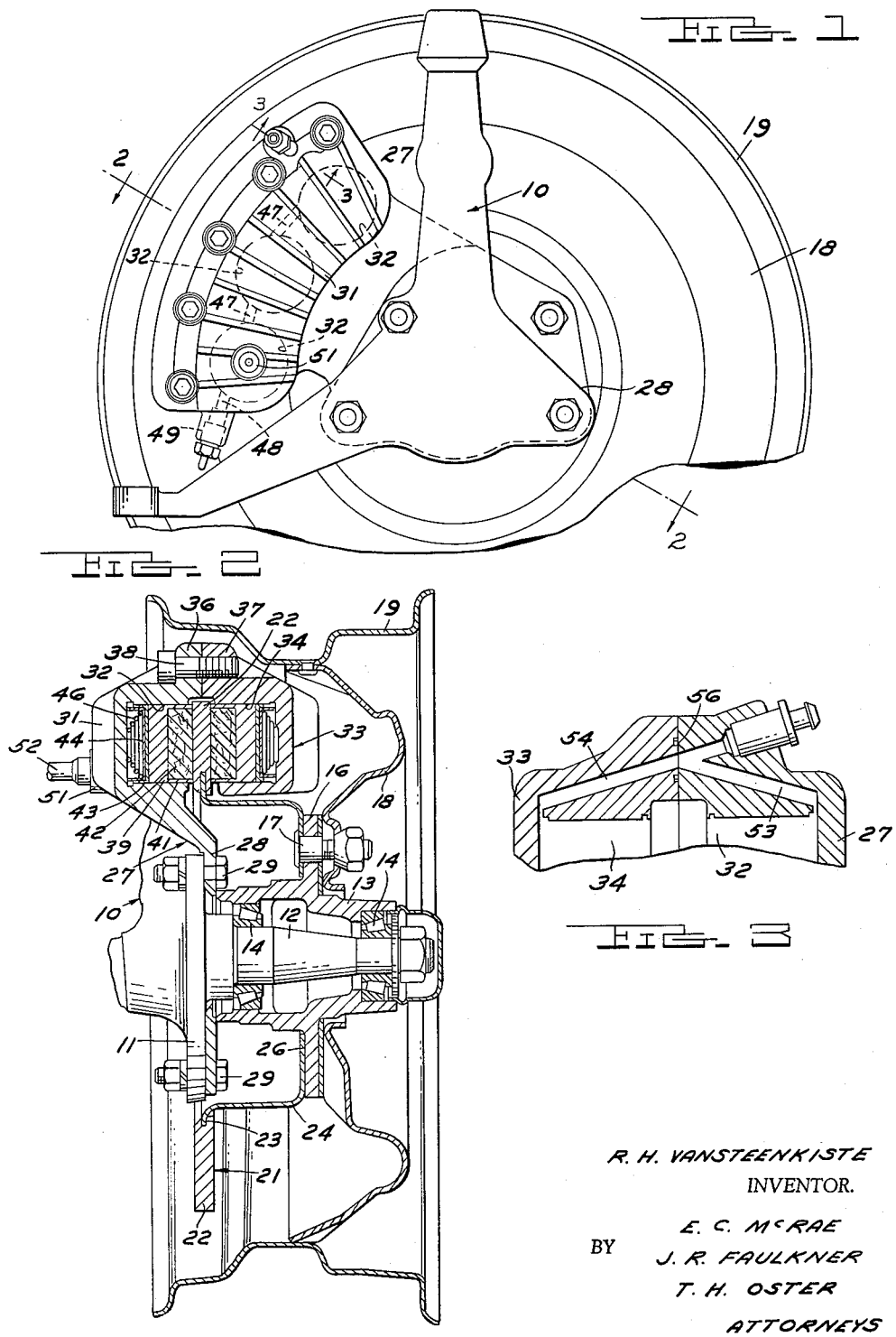

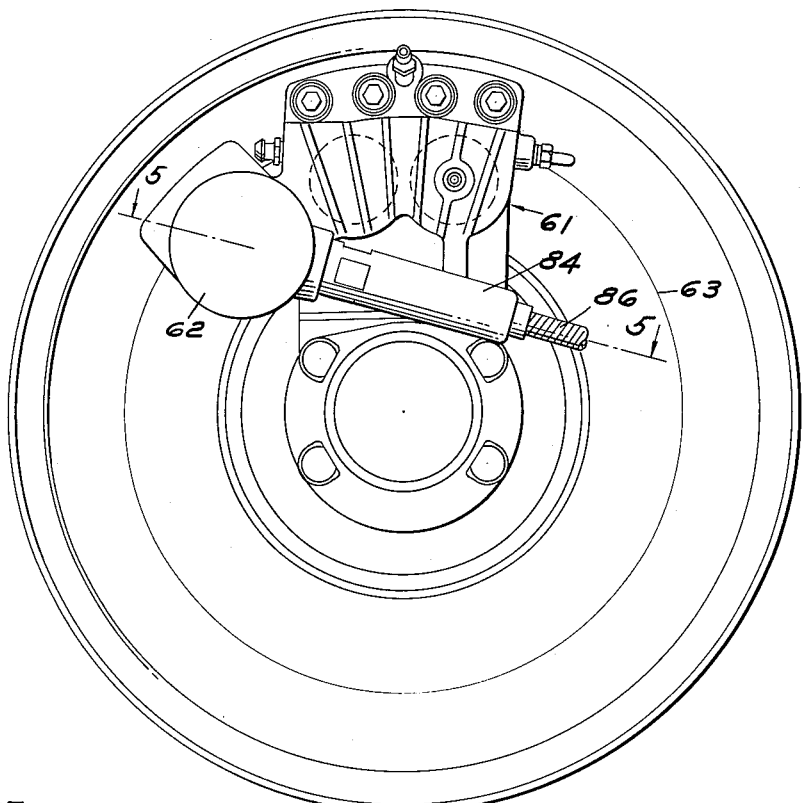
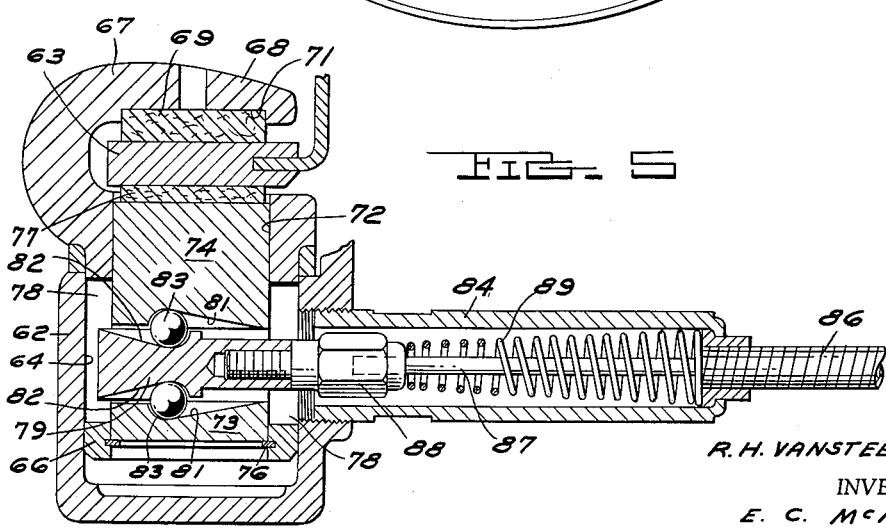

2,983,338

SPOT DISC BRAKE

Rene H. Vansteenkiste, Inkster, Mich., assignor to Ford Motor Company, Dearborn, Mich., a corporation of Delaware Filed Aug. 25, 1958, Ser. No. 756,968

3 Claims. (Cl. 188—73)

This invention relates to brakes for motor vehicles, and particularly to brakes of the spot disc type.

An object of the present invention is to provide a disc brake having the properties of adequate braking characteristics for todays heavy and high speed vehicles together with adequate cooling of the brake members to retain brake efficiency and prevent brake fade. Another object is to provide a brake compact in design and suitable for relatively small diameter wheels. Still another object is to provide a brake of the above type which is economical to manufacture, reliable in operation, and which will require a minimum of maintenance.

Other objects and advantages of this invention will be made more apparent as this description proceeds, particularly in connection with the accompanying drawings, in which:

Figure 1 is an elevational view of a front wheel brake constructed according to the present invention, viewed from the inboard side of the wheel;

Figure 2 is a cross section on the line 2—2 of Figure 1;

Figure 3 is a cross section on the line 3—3 of Figure 1;

Figure 4 is an elevational view of a rear view brake constructed according to the present invention;

Figure 5 is a cross section on the line 5—5 of Figure 4.

Referring now to the drawings, and particularly to Figures 1 and 2, the reference character 10 indicates generally a wheel spindle support for a front wheel adapted to be conventionally attached to the upper and lower arms of an independent suspension. The spindle support 10 has an integral mounting flange 11 and a wheel spindle 12. The hub 13 of a vehicle wheel is mounted upon the spindle 12 by bearings 14. Integrally formed with the wheel hub 14 is the wheel flange 16 carrying a series of circumferentially spaced studs 17 for mounting the wheel disc 18 thereon. A wheel rim 19 is secured to the outer periphery of the wheel disc to support a tire (not shown).

Also secured to the wheel hub flange 16 by the studs 17 is a brake disc 21. The brake disc 21 comprises a cast radially extending disc 22 having parallel sides for engagement by the brake lining. The disc 22 is cast or otherwise suitably secured to the outer periphery of the inboard marginal flange 23 of stamping 24, the latter having an outboard flange 26 positioned adjacent the wheel hub flange 16 and secured thereto by the studs 17. It will be noted that the cast brake disc 22 is generally in radial alignment with the mounting flange 11 of the spindle to equalize the forces during braking.

The mounting flange 11 of the spindle support 10 supports the inboard cylinder head 27, the latter having a supporting flange 28 secured to the mounting flange 11 by bolts 29. The cylinder head 27 is formed with radial cooling fins 31, and with three circumferential spaced chrome plated cylinder bores 32 extending axially of the wheel and opening toward the adjacent face of the brake disc 22.

An outboard cylinder head 33 is positioned on the opposite side of the brake disc 22 and similarly has three circumferentially spaced cylinder bores 34 axially aligned with the cylinder bores 32 and opening toward the opposite face of the brake disc 22. The cylinder heads 27 and 33 have opposed radially outer flanges 36 and 37 respectively abutting each other outwardly beyond the periphery of the brake disc 22. A series of bolts 38 secure the flanges 36 and 37 together to form a combined cylinder head unit embracing the brake disc and yet readily detachable for maintenance and assembly purposes.

Inasmuch as the piston and lining construction of each cylinder is the same, only one will be described in detail. The reference character 39 indicates a nonmetallic piston slidably mounted within the cylinder 32. The piston is preferably formed of a plastic having high heat insulating qualities to form a barrier for heat generated during the braking engagement. The piston 39 is formed with an integral annular thin walled extension 41 at its periphery projecting toward the brake disc 22. A suitable friction lining 42 in the shape of a disc is seated within the annular thin walled extension 41, and has its outer face flush with the ends of the extension 41 so that both the friction lining and the piston extension will simultaneously engage the adjacent face of the brake disc 22.

A rubber sealing ring 43 is seated within the cylinder adjacent the rearward end of the piston 39, and is held in place by a metal retaining cup 44 and a coil spring 46. During assembly the cup 44 engages the rear wall of the cylinder and prevents the sealing ring 43 from collapsing and also from engaging the fluid ports interconnecting the adjacent cylinders since this might cause damage to the ring.

The three cylinders in each cylinder head are interconnected by passages 47 drilled in the head, and one end cylinder is connected by a passage 48 to a fitting 49 which may be used to bleed the system. One cylinder is also provided with a fitting 51 adapted to be connected by a conduit 52 to the brake master cylinder or other fluid pressure source to supply fluid under pressure to the cylinders.

With reference to Figure 3 it will be noted that the cylinders in the inboard and outboard cylinder heads 27 and 33 are adapted to be connected by intersecting passages 53 and 54. These passages establish fluid communication between the cylinders 32 and 34 in the respective cylinder heads. A rubber sealing ring 56 is provided at the juncture between the two cylinder heads to form a seal around the intersecting passages and to prevent fluid leakage.

When fluid pressure is supplied to the cylinders the friction linings 42 are actuated by the pistons 39 to clamp the rotating brake disc 22 therebetween. Since the disc is exposed to the air, heat is rapidly dissipated, and since the pistons are of nonmetallic material having good heat insulating properties, the heat is substantially prevented from reaching the adjacent body of hydraulic oil. The nonmetallic pistons 39 also have improved dimensional stability under the extreme heat conditions encountered, and maintain smooth sliding engagement with the cylinder walls.

Automatic adjustment for wear is provided since the springs 46 lightly maintain the thin walled piston extensions 41 and the friction lining 42 in light engagement with the brake disc 22. The annular piston extensions 41 have a relatively low coefficient of friction compared to that of the friction lining 42, and the wear on the linings is negligible during normal periods of vehicle operation in between brake applications. The piston extensions wear in conformity with the wear on the friction linings so that the linings remain flush with the outer end of the piston extensions.

Reference is now made to Figures 4 and 5 which illustrate the brakes for the rear wheels. In general, the brakes are similar except that the inboard and outboard cylinder heads have two rather than three cylinders. This, of course, can vary, dependent on the brake requirements between the front and rear wheels of the vehicle. The rear wheel brakes also incorporate parking brakes adapted to be mechanically actuated by a hand lever or foot pedal (not shown) from the drivers position.

The inboard cylinder head 61 of the rear brake is formed with an extension 62 integrally cast with the cylinder head, and positioned circumferentially of the brake disc 63 from the cylinders in the cylinder head 61. The extension 62 is formed with a bore 64 therein extending axially of the vehicle wheel, and opening toward the brake disc 63. A member 66 is slidably mounted within the bore 64 and has a caliper end 67 encircling the outer periphery of the brake disc 63 and formed with an integral flange 68 extending parallel to the brake disc on the opposite side thereof. A friction lining 69 in the form of a disc is seated within a socket 71 in the caliper end flange 68.

The slidable member 66 is also formed with a bore 72 receiving a pair of axially spaced plungers 73 and 74. The plunger 73 seats against a retaining ring 76 and the plunger 74 carries a friction lining 77 in the form of a disc adapted to frictionally engage the adjacent face of the brake disc 63. A pair of opposed slots 78 are formed in opposite sides of the slidable member 66 to provide clearance for an actuating member 79 extending into the cylinder head extension 62 through the slot 78, and located between the inboard and outboard plungers 73 and 74. The plungers 73 and 74 are formed with inclined cam surfaces 81 on their adjacent faces, and the actuating member 79 is similarly formed with inclined cam faces 82 on the opposite sides thereof for cooperation with a pair of anit-friction balls 83.

A tubular cap 84 is screwed into an opening in the cylinder head extension, and supports a conduit 86 having a flexible cable 87 therein. The cable 87 is connected to a fitting 88 adjustably connected to the end of the actuating member 79. A return spring 89 is contained with the cap 84 and abuts the end of the fitting 78. The flexible cable 87 is connected to the hand or foot brake lever for operation by the driver, and when pulled will, through the balls 83 and the adjacent cam surfaces 81 and 82, move the caliper 67 and the plunger 74 in opposite directions to clamp the linings 69 and 77 to the opposite faces of the brake disc 63. When the brake is released the return spring 89 permits the parts to return to their normal position.

It will be understood that the invention is not to be limited to the exact construction shown and described, but that various changes and modifications may be made without departing from the spirit and scope of the invention, as defined in the appended claims.

What is claimed is:

1. In a disc brake of the spot type, a rotatable road wheel, a nonrotatable support, a disc carried by said wheel and having opposed friction faces, a pair of cylinder heads on opposite sides of said disc, means mounting said heads on said support, opposed cylinders in said heads in axial alignment with each other, hydraulically actuated pistons in said cylinders, friction facings for said pistons adapted to be urged thereby into frictional engagement with the opposite face of said disc, an integral extension on one of said heads spaced circumferentially of said disc from said cylinders, said extension having an axially extending bore opening toward said disc adjacent the periphery thereof, a slidable member in said bore having a caliper end extending around the periphery of said disc and adjacent the opposite face of said disc, a friction lining carried by said caliper end, said slidable member having a bore therein, a plunger slidable in said last named bore, a friction lining carried by said plunger, and actuating means for moving said slidable member and said plunger in opposite directions to urge said friction linings into frictional engagement with the opposite faces of said disc, said actuating means comprising an element extending radially between portions of said slidable member and said plunger and having an inclined cam surface on opposite sides thereof, antifriction rollable elements between said cam surfaces and the adjacent portions of said slidable member and said plunger, and a flexible actuating member connected to said element to move the latter radially of said bore to apply said friction linings to said disc.

2. In a disc brake of the spot type, a brake disc having opposed friction faces, the combination comprising a member having an axially extending bore opening toward said disc adjacent the periphery thereof, a slidable member in said bore having a caliper end extending around the periphery of said disc and adjacent the opposite face of said disc, a friction lining carried by said caliper end, said slidable member having a bore therein, a plunger slidable in said last named bore, a friction lining carried by said plunger, and actuating means for moving said slidable member and said plunger in opposite directions to urge said friction linings into frictional engagement with the opposite faces of said disc, said actuating means comprising an element extending radially between portions of said slidable member and said plunger and having an inclined cam surface on opposite sides thereof, antifriction rollable elements between said cam surfaces and the adjacent portions of said slidable member and said plunger, and a flexible actuating member connected to said element to move the latter radially of said bore to apply said friction linings to said disc.

3. In a brake of the caliper type, the combination comprising a pair of reciprocable caliper members having opposed friction faces, said members having inner and outer portions concentric one within the other, said portions having opposed cam faces axially spaced apart from said friction faces, an actuating member interposed between said cam faces, antifriction elements disposed interconnecting said cam faces and said actuating members, means adapted to move said actuating member normal to the axis of said caliper members in cam action engagement with said faces thereby forcing said cam faces apart and said friction faces toward each other.

References Cited in the file of this patent

UNITED STATES PATENTS

| | | |
|---|---|---|
| 2,081,076 | Walker | May 18, 1937 |
| 2,612,968 | Hood | Oct. 7, 1952 |
| 2,790,516 | Wright et al. | Apr. 30, 1957 |
| 2,801,714 | Dotto | Aug. 6, 1957 |
| 2,815,104 | Du Shane | Dec. 3, 1957 |
| 2,856,034 | Mossey | Oct. 14, 1958 |

FOREIGN PATENTS

| | | |
|---|---|---|
| 727,469 | Great Britain | Apr. 6, 1955 |
| 728,376 | Great Britain | Apr. 20, 1955 |
| 732,724 | Great Britain | June 29, 1955 |